(No Model.)

N. CHASE.
FLY TRAP.

No. 307,016. Patented Oct. 21, 1884.

WITNESSES
Villette Anderson.

INVENTOR
Newton Chase
by Anderson & Smith
ATTORNEYS

N. PETERS, Photo-Lithographer, Washington, D. C.

UNITED STATES PATENT OFFICE.

NEWTON CHASE, OF FORT SCOTT, KANSAS.

FLY-TRAP.

SPECIFICATION forming part of Letters Patent No. 307,016, dated October 21, 1884.

Application filed April 5, 1884. (No model.)

*To all whom it may concern:*

Be it known that I, NEWTON CHASE, a citizen of the United States, and a resident at Fort Scott, in the county of Bourbon and State of Kansas, have invented certain new and useful Improvements in Fly-Traps; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
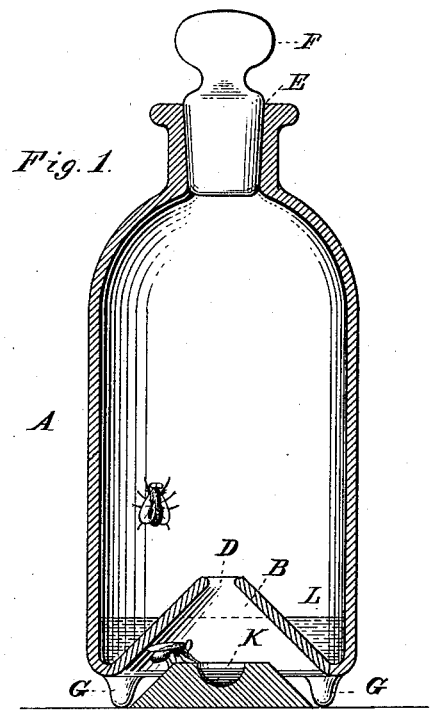
Figure 2:
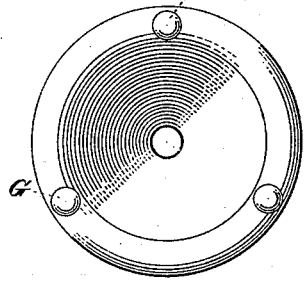
Figure 3:
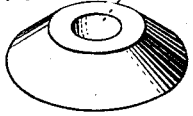

Figure 1 of the drawings is a representation of this invention, and is a vertical section. Fig. 2 is a bottom view of the jar. Fig. 3 is a perspective view of the bait-board.

This invention has relation to fly-traps; and it consists in the construction and novel arrangement of the inverted-funnel bottom of the glass jar, the feet of the jar whereby its base is raised, and the bait board or plate under the funnel-bottom, all as hereinafter set forth.

In the accompanying drawings, the letter A designates a jar-shaped vessel having the bottom B, which is in the form of an inverted funnel, its wall C sloping upward and inward to the central opening, D. The mouth E of the jar is provided with a stopper, F.

G G represent the feet on which the jar stands. These feet project a little from the base, so that the bottom of the jar is elevated from the floor or table on which it may be placed, sufficiently to allow the flies to pass under the marginal portion of the base to the bait board or plate H, which is seated under said base.

The bait-board is usually made with a beveled margin and a depressed central recess, K, in which a little sirup is placed. The flies, attracted into the conical chamber under the bottom of the jar by the bait, crawl upon the board or plate, and therein pass up through the opening in the top of the inverted-funnel base into the jar.

The form of the bottom of the jar provides an annular chamber, L, around the conical wall, in which is poured a small quantity of concentrated lye, which is designed to prevent the flies from seeking the exit-opening in the bottom, and eventually to kill them.

I am aware that various means have been devised for trapping flies, and in some cases a glass jar having an inverted-funnel-shaped bottom open at its upper end has been used, being supported upon a bait-board by a holding device to permit a passage for the flies between the said jar and bait-board, and also that a jar having a similar bottom has been corrugated around its base edge to form a passage for flies; but in such construction the jar has not been provided with legs to support it around and above the marginally-beveled bait-board.

Having described this invention, what I claim, and desire to secure by Letters Patent, is—

As an improvement in fly-traps, the combination, with the marginally-beveled bait-board K, of the jar A, having the usual inverted-funnel-shaped base provided with a central opening, D, and its bottom provided with the legs G, whereby the said jar may be supported above the bait-board, and a continuous annular passage formed beneath the said jar for the flies, substantially as shown and described.

In testimony whereof I affix my signature in presence of two witnesses.

NEWTON CHASE.

Witnesses:
W. J. SMITH,
LEVI A. WARFIELD.